No. 780,809. PATENTED JAN. 24, 1905.
C. A. PARSONS & A. D. WASS.
STEAM TURBINE.
APPLICATION FILED SEPT. 16, 1904.
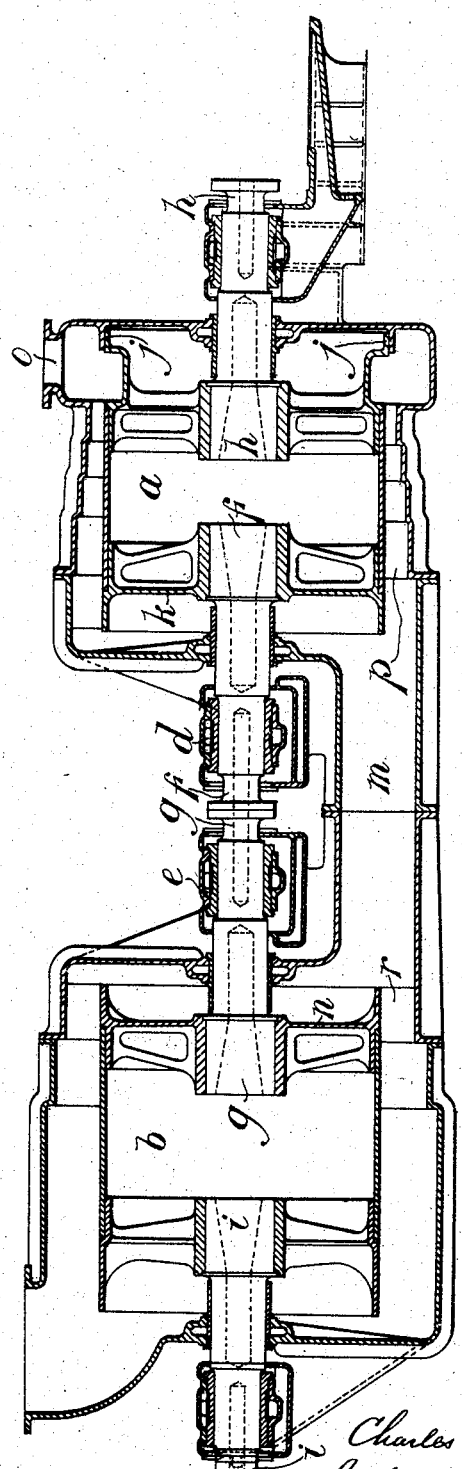
Attest
Inventors
Charles A. Parsons
Archibald D. Wass
by Spear, Middleton, Donaldson & Spear
Attys.

No. 780,809. Patented January 24, 1905.

UNITED STATES PATENT OFFICE.

CHARLES ALGERNON PARSONS AND ARCHIBALD DOUGLAS WASS, OF NEWCASTLE-UPON-TYNE, ENGLAND.

STEAM-TURBINE.

SPECIFICATION forming part of Letters Patent No. 780,809, dated January 24, 1905.

Application filed September 16, 1904. Serial No. 224,716.

*To all whom it may concern:*

Be it known that we, CHARLES ALGERNON PARSONS and ARCHIBALD DOUGLAS WASS, subjects of the King of Great Britain and Ireland, residing at Heaton Works, Newcastle-upon-Tyne, in the county of Northumberland, England, have invented certain new and useful Improvements in Steam-Turbines, of which the following is a specification.

This invention relates to the construction more especially of very large turbines and is also applicable to smaller sizes, the object being to diminish the size of the parts of the turbines by enabling them to be divided into distinct elements generally for placing in series on the steam.

Hitherto when dividing steam-turbines into several distinct elements mounted on their own bearings and coupled together with the shafts in line what we have called "tandemwise" it has been usual for the purpose of balancing to place a dummy piston in each element and to connect the ends of the turbine-barrels by a pipe or by an internal passage-way in the rotating element.

The object of our present invention is to provide for the dividing up of the turbine without requiring the intermediate dummies hitherto used.

Our invention consists in dividing up a turbine into two or more parts in tandem on a shaft by interposing external bearings and employing balancing diaphragms not requiring running packings, as hereinafter described.

Referring now to the accompanying drawing, which illustrates one form of the invention, the elements $a$ and $b$ of a turbine are placed in series on one shaft. Between the two elements the bearings $d$ and $e$ are placed, in which the shafts $f$ and $g$ rotate. It will be seen that the shaft does not pass the whole way through the drums of the turbine, but is made in parts $f\,g\,h\,i$ for convenience of construction.

The high-pressure element $a$ is provided at the steam-inlet end $o$ with a dummy piston $j$, which in the case of marine turbines is usually made small, so as to balance the propeller end thrust by the pressure of the steam on the blades. At the outlet end $p$ of the high-pressure element the turbine-drum is closed by a diaphragm $k$, while a passage $m$ leads to the inlet side $r$ of the low-pressure turbine, the drum of which is closed near the inlet end by means of a diaphragm $n$. In the figures the diaphragms $k$ and $n$ are of the same diameter, and since they are subjected to the same pressure in opposite directions the end balance of the two turbines as a whole is the same as if they had not been divided, and the size of the dummy piston $j$ and other parts is regulated by the same conditions as in Parsons' previous patents.

It will be understood that the present invention may be applied to turbines arranged in multiple elements on parallel shafts—such, for instance, as are described in Parsons' Patents Nos. 716,468 and 608,969. In such cases each shaft has at least one dummy piston placed at the inlet end of the highest-pressure element. The other elements on the same line of shafting have not dummy pistons unless the number of such elements is too great to allow of adequate balancing being obtained by one dummy piston on the highest-pressure element.

This construction of turbine may be advantageously applied to marine propulsion; but it is also serviceable for land, the particular features being the elimination of a number of the dummy pistons. The lightness and simplicity of the parts render it serviceable for all purposes where weight is a serious consideration.

Having thus described our invention, what we claim as new, and desire to secure by Letters Patent, is—

1. An elastic-fluid turbine, comprising a plurality of elements placed in series on coupled shafts, bearings interposed between said elements, diaphragms on the ends of the turbine-drums in said elements, said diaphragms being arranged to effect end balancing between the turbine elements, substantially as described.

2. An elastic-fluid turbine, comprising a plurality of elements placed in series on coupled shafts, bearings interposed between said elements, steam connections from the outlet end of each element to the inlet end of the adjacent element, diaphragms on the adjacent inlet and outlet ends of the turbine-drums in said elements, means for balancing the end thrust on the blades, substantially as described.

3. An elastic-fluid turbine, comprising a plurality of elements placed in series on coupled shafts, bearings interposed between said elements, steam connections from the outlet end of each element to the inlet end of the adjacent element, diaphragms on the adjacent outlet or inlet ends of the turbine-drums in said elements, a dummy piston in one of the higher-pressure elements, said dummy pistons being arranged to balance the end thrust on the blades in that and other elements on the coupled shafts, substantially as described.

4. An elastic-fluid turbine comprising two elements placed in series on coupled shafts, bearings interposed between said elements, steam connections from the outlet end of one element to the inlet end of the other, diaphragms on the adjacent outlet and inlet ends of the turbine-drums in the two elements, a dummy balancing-piston on the higher-pressure element, said piston being adapted to balance the steam-thrust on the blades of both elements, substantially as described.

In testimony whereof we have signed our names to this specification in the presence of two subscribing witnesses.

CHARLES ALGERNON PARSONS.
ARCHIBALD DOUGLAS WASS.

Witnesses:
FREDERICK GORDON HAY BEDFORD,
WILLIAM MENZIES JOHNSTON.